United States Patent [19]

Carre et al.

[11] 4,353,599

[45] Oct. 12, 1982

[54] BRAKING CORRECTOR FOR DOUBLE BRAKING CIRCUIT

[75] Inventors: Jean-Jacques Carre, Montreuil; Christian Riquart, Paris, both of France

[73] Assignee: Societe Anonyme D.B.A., Paris, France

[21] Appl. No.: 195,701

[22] Filed: Oct. 9, 1980

[30] Foreign Application Priority Data

Oct. 10, 1979 [FR] France ................................ 79 25199

[51] Int. Cl.³ ............................................. B60T 8/18
[52] U.S. Cl. .................................... 303/22 R; 303/52; 303/84 R
[58] Field of Search .................... 303/6 A, 6 R, 22 A, 303/22 R, 84 R, 52

[56] References Cited

U.S. PATENT DOCUMENTS

| | | | |
|---|---|---|---|
| 3,379,479 | 4/1968 | Lepelletier | 303/22 R |
| 3,449,018 | 6/1969 | Hales | 303/22 R X |
| 3,486,802 | 12/1969 | Cadiou | 303/22 A |
| 3,525,554 | 8/1970 | Oberthur | 303/22 A |
| 4,203,627 | 5/1980 | Kono | 303/22 R |

FOREIGN PATENT DOCUMENTS

| | | |
|---|---|---|
| 2074521 | 10/1971 | France . |
| 2237788 | 2/1975 | France . |
| 2297756 | 8/1976 | France . |
| 2306107 | 10/1976 | France . |
| 2369953 | 6/1978 | France . |
| 2370212 | 6/1978 | France . |
| 2385567 | 10/1978 | France . |
| 2425356 | 12/1979 | France . |
| 2020768 | 11/1979 | United Kingdom . |

*Primary Examiner*—Duane A. Reger
*Attorney, Agent, or Firm*—Paul David Schoenle; Ken C. Decker

[57] ABSTRACT

The corrector comprises two identical parallel pistons which control the opening and closing of two valves located between two inlets and two outlets of two braking circuits. Two push rods subjected to a control pressure urge the pistons in the direction for opening the valves. A reaction spring cooperates with a transmission element to urge the push rods in the opposite direction. When both braking circuits are being supplied, the corrector presents an identical cut-off point for the two circuits. In the event of one of the circuits failing, the transmission element undergoes tilting which results in an unequal sharing of the reaction force and an increase in the cut-off point in the undamaged circuit.

7 Claims, 3 Drawing Figures

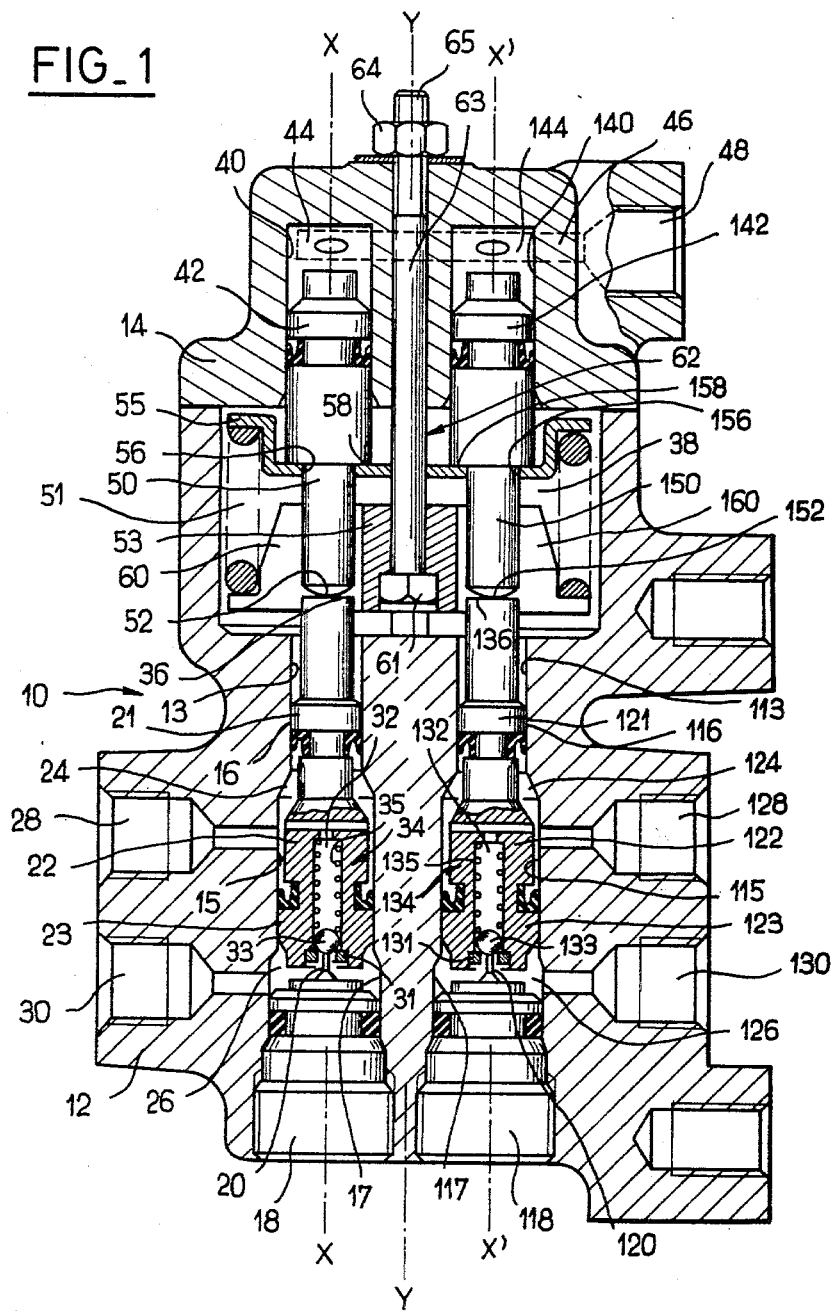
FIG_1

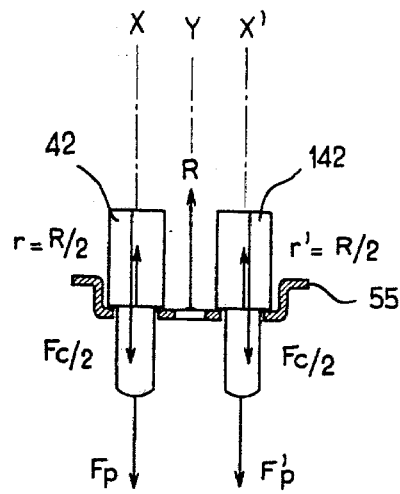
FIG_2
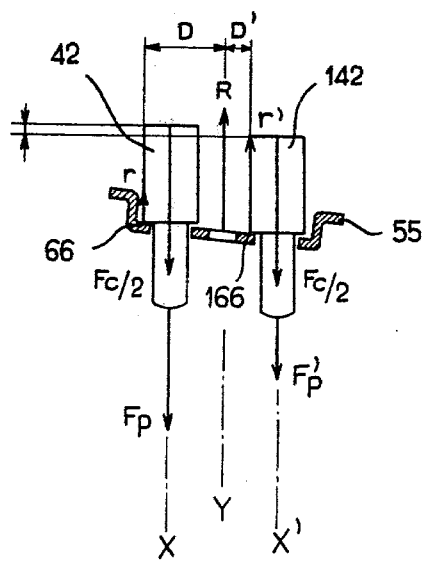
FIG_3

BRAKING CORRECTOR FOR DOUBLE BRAKING CIRCUIT

The invention concerns braking corrector valves for a double braking circuit of a motor vehicle, particularly intended for braking circuits known as "X" circuits in which two sources of fluid under pressure—for example, the two chambers of a tandem master-cylinder—each supply a brake motor associated with a front wheel at one side of the vehicle and a brake motor associated with a rear wheel at the other side of the vehicle. These braking corrector valves are intended to limit and/or reduce the pressure admitted to the rear braking motors when the pressure delivered by the master-cylinder exceeds a pressure known as "cut-off" pressure determined by the characteristics of the corrector valve. Such a valve is described in French patent application No. 75 10131.

In the event of one of the circuits failing, a considerable problem arises when an increase of the cut-off pressure into the undamaged circuit is required; in fact, in this situation, as braking capability is practically halved, it is necessary to admit a greater braking pressure to the rear brake motor associated with the undamaged circuit.

For this purpose, the invention proposes a braking corrector, for the double braking circuit of a motor vehicle, comprising: a body, two identical parallel bores in the said body defining between them an axis of symmetry, each of the said bores communicating with a corresponding inlet orifice and outlet orifice, two identical pistons sliding in the said bores, each of the said pistons controlling the displacements of a valve element controlling the flow of a fluid under pressure between one of the said inlet orifices and the corresponding outlet orifices, each said pistons presenting an end projecting out from the said body, and a distributor assembly capable of generating, from a control force, two pilot forces acting on the said ends so as to urge the pistons into the body in the direction for establishing the said flow of fluid, the said fluid under pressure urging the pistons out of the body in the direction for cutting off the flow of fluid, characterised in that the said distributor assembly comprises: a cover solid with the said body, two identical push rods sliding in the said cover parallelly to the said pistons and capable of abutting the ends of these last, divider means for dividing the said control force into two equal half-control-forces each applied to one of the two push rods so as to urge the said pistons into the said body, resilient means to cause a reaction force opposed to the said half-control-forces, and a transmission element to distribute the said reaction force as two partial reaction forces each applied to one of the said push rods, each push rod being thereby subjected to two opposed forces: a half-control-force and a partial reaction force, the resultant of which constitutes the said pilot force, the said transmission element being capable of being in contact with the said push rods in two manners: a first manner, when both inlet orifices receive fluid under pressure, in which the surfaces of contact between the transmission element and the push rods are disposed in a symmetrical manner with respect to the said axis of symmetry, and a second manner, when only one of the two inlet orifices receives fluid under pressure, in which, following tilting of the transmission element, the surfaces of contact between this last and the push rod are disposed in an asymmetric manner with respect to the said axis of symmetry, which results in a distribution of the reaction forces as two unequal partial forces and a corresponding inequality of the two pilot forces.

It will be noted that the invention allows the "cut-off" pressure of one of the circuits to be increased in the event of the other circuit failing. In fact, in this situation, only the piston associated with the undamaged circuit is capable of being displaced in opposition to the pilot force exerted by the corresponding push rod. As explained in detail in the following description, a disequilibrium consequently occurs in the distribution of the reaction force acting on the transmission element and there is an increase in the pilot force acting on the piston associated with the undamaged circuit, which results in an increase in the "cut-off" pressure of this circuit.

According to another characteristic, the corrector push rods are subjected to a pressure of fluid coming from the hydraulic suspension circuit of the vehicle when the latter has such a suspension circuit.

This allows the operation of the corrector to be slaved to the state of loading of the vehicle while avoiding problems associated with mechanical linkages between suspended and non-suspended parts of the vehicle as well known to those skilled in the art.

The invention will now be described with reference to the attach drawings in which:

FIG. 1 is a view in longitudinal section of a braking corrector valve according to the invention;

FIG. 2 is a diagrammatic representation of a transmission element and two push rods of the valve of FIG. 1, in the positions they occupy in normal working; and FIG. 3 is a diagrammatic representation like that of FIG. 2, the afore-mentioned elements being in the positions they occupy in the event of failure of one of the braking circuits.

With reference to FIG. 1, a corrector 10 for a double braking circuit comprises a body 12, closed at its upper part by a cover 14, and in which are made two identical stepped bores 16, 116 with parallel axes XX or X'X' and having an axis of general symmetry YY. Each bore 16, 116 comprises a small diameter part 13, 113, an intermediate diameter part 15, 115 and a large diameter part 17, 117 closed by a plug 18, 118 including a stem 20, 120 whose function will be described in detail later. In each bore 16, 116 a stepped piston 22, 122 is mounted whose small diameter part 21, 121 slides in the small diameter part 13, 113 of the bore and whose large diameter part 23, 123 slides in the intermediate diameter part 15, 115 of the bore. The piston 22, 122 defines with the bore 16, 116 on the one hand between its parts 21, 121 and 23, 123 a first chamber termed the inlet chamber 24, 124 and on the other hand between the part 23, 123 and the plug 18, 118 a second chamber termed the outlet chamber 26, 126. The inlet chamber 24, 124 is connected via an inlet orifice 28, 128 to an independent source of hydraulic braking pressure (not represented), and the outlet chamber 26, 126 is connected via an outlet orifice 30, 130 to a set of brake motors of the vehicle (also not represented). The independent pressure sources are formed by way of example by a conventional tandem master-cylinder of any known type.

The piston 22, 122 is provided with a passage 32, 132 comprising an axial portion and a radial portion, in which is located a ball valve 34, 134 comprised of an annular seat 31, 131, a ball 33, 133 and a spring 35, 135.

Finally, the upper end 36, 136 of the piston 22, 122 projects into a cavity 38 cut in the upper part of the body 12 closed by the cover 14.

The cover 14 is provided with two parallel blind bores 40 and 140 in which slide two identical push rods 42, 142 defining with the said blind bores two control chambers 44, 144, connected together via a passage 46 which opens into an orifice 48 connected to the hydraulic suspension system of the vehicle (not represented) so that a pressure $P_h$ representing the load supported by the rear axle of the vehicle prevails in the two control chambers 44, 144.

The push rods 42, 142 include at their lower ends extensions of reduced diameter 50, 150 whose ends 52, 152 are in contact with the ends 36, 136 of the pistons 22, 122.

In the cavity 38 a reaction spring 51 is placed, trapped between an abutment plate 53 and a transmission element 55 which has the general shape of a disc and has two apertures 56, 156 symmetrical with respect to the axis of symmetry YY, through which pass respectively the extensions 50, 150 of the push rods 42 142. The element 55 is in contact with shoulders 58, 158 provided on the push rods 42, 142, these shoulders constituting thrust receiving surfaces for the push rods. The annular surfaces located opposite the shoulders 58, 158 and surrounding the apertures 56, 156 constitute thrust transmitting surfaces for the transmission element. The plate 53 has two grooves 60, 160 allowing passage of the extensions 50, 150 of the push rods 42, 142 and the ends 36, 136 of the pistons.

Lastly, the axial position of the plate 53 with respect to the push rods 42, 142 can be adjusted by means of a screw 62-nut 64 assembly. The screw 62 comprises a head 61, received in a complementary cavity of the plate 53 to prevent rotation of the screw 62 with respect to the latter, a rod 63 passing successively through the plate 53, the transmission element 55 and the cover 14, and finally a threaded part 65 onto which the nut 64 is screwed until it abuts against the cover 14.

The cover 14, the control chambers 44, 144 and the push rods 42, 142 constitute divider means intended to divide a control force into two half control-forces each applied to one of the push rods 42, 142.

In addition, the assembly bringing together these divider means, the reaction spring 51, the abutment plate 53 and the transmission element 55 constitutes a distributor assembly capable of generating, from this control force, two pilot forces urging the two pistons in the direction tending to cause opening of the ball valves, as will appear from reading the description hereinafter of the operation of the corrector which has just been described.

With the vehicle immobile and in the absence of any braking action, a residual low pressure prevails at the inlet orifices 28, 128 and at the outlet orifices 30, 130. The pressure $P_h$ prevailing in the hydraulic suspension circuit is transmitted to the orifice 48 and via the passage 46 to the control chambers 44, 144. This pressure, termed control pressure, exerts on the push rods 42, 142 a control force $F_c$ divided into two half control-forces $F_c/2$ directed downwards, with reference to FIG. 1. The control chamber-push rod assembly constitutes the divider means for dividing the control force into two equal half control-forces $F_c/2$ which push the pistons 22, 122 back into abutment against the plugs 18, 118 so that the stems 20, 120 disengage the balls 33, 133 from their seatings 31, 131.

The push rods 42, 142 occupy identical axial positions; as a result, the transmitter and receiver support surfaces of the transmission element 55 and the push rods cooperate in a symmetrical manner and the reaction force R exerted by the spring 51 is distributed as two partial reaction forces r and r' equal to R/2 and directed along the axes XX and XX' respectively. The two push rods also consequently exert two equal pilot forces $F_p$ and $F_p'$ on the pistons 22, 122.

When there is a normal braking action, substantially equal input pressures prevail at the orifices 28, 128. With the valves 34, 134 open, these input pressures are transmitted to the outlet orifices 30, 130 in which output pressures which are substantially equal to each other and equal to the input pressures consequently prevail. The pistons 22 and 122 are therefore subjected to forces directed upwards.

As long as these forces are less than the pilot forces $F_p$ and $F_p'$, the two pistons remain stationary, the valves 34, 134 remain open and the output pressures remain equal to the input pressures.

Conversely, when the input pressures reach a pressure termed cut-off pressure $P_c$, the pistons 22, 122 are then able to be displaced simultaneously upwards, causing the ball valves 34, 134 to close. When the input pressures exceed this value $P_c$, the output pressures are corrected so that the increase in the output pressure is proportionally less than that of the input pressure, and, as well understood in the art, this applies to both circuits.

As a variant of the invention, pistons of constant effective section can of course be selected, this variant then functioning as a simple pressure limiter, the output pressure being then limiting to a fixed value for a given vehicle load.

It will be noted that the cut-off pressure $P_c$ depends on the one hand on the adjustment of the reaction force R by means of the screw 62-nut 64 assembly and on the other hand on the vehicle load; in fact, as the pressure $P_h$ is directly linked with this load, the same is true for the control force $F_c$.

In the event of failure of one of the braking circuits, the apparatus described works as follows:

Assuming there is, for example, an absence of input pressure at the orifice 128. As long as the input pressure prevailing at the orifice 28 remains less than $P_c$, the piston 22 remains stationary, the elements of the apparatus occupy the positions they normally occupy and the output pressure at the orifice 30 equals the input pressure as before.

Conversely, when the input pressure reaches the value $P_c$, the piston 22 begins to be displaced upwards, while the piston 122 remains stationary, in abutment on the plug 118. The transmission element 55 consequently undergoes tilting in the clockwise direction, with reference to FIG. 1, and the distribution of the reaction force R undergoes a considerable change, as will be explained with reference to FIGS. 2 and 3.

In FIG. 2, the push rods 42, 142 and the transmission element 55 are represented in the positions they occupy in normal working. The forces to which the push rods are subjected have also been represented. As has been explained above, the two partial reaction forces r and r' are equal to R/2 and directed along the axes XX and X'X' of the push rods, and the two pilot forces $F_p$ and $F_p'$ are equal.

In FIG. 3, the push rods 42, 142 and the transmission element 55 are represented in the positions they occupy in the case of absence of input pressure at the orifice 128. As has just been explained, when the piston 22 drives the push rod back upwards, the transmission element 55 undergoes tilting in the clockwise direction. The transmitter and receiver thrust surfaces of the transmission element and of the push rods are no longer in contact with each other. The contact between transmission element and push rod is then established in two regions 66, 166 located on the edges of the shoulders 58, 158, and being at distances with respect to the axis YY which are respectively D and D', D' being less than D.

The reaction force R is then distributed between the two push rods as two partial reaction forces $$r = R \frac{D'}{D + D'} \text{ and } r' = R \frac{D}{D + D'}$$

r being less than R/2. The pilot force $F_p$ which the push rod 42 exerts on the piston 22 becomes greater than $F_p'$.

This pilot force consequently increases. The piston 22 can consequently no longer travel upwards as long as the input pressure does not reach a new value $P_c'$ greater than $P_c$, and the output pressure remains equal to the input pressure. It is only when the input pressure reaches the value $P_c'$ that the piston can again travel upwards and the output pressure undergoes a limiting effect by actuation of the valve 34, as already described. In the event of failure of the other braking circuit, the system words in a symmetrical manner.

To sum up, in the event of failure of one of the braking circuits, the corrector valve according to the invention allows the cut-off pressure in the undamaged circuit to be increased and consequently the braking capability of the back wheel supplied by this circuit to be increased.

In the variants of the invention not represented, the pressure $P_h$ can be obtained by means of any generator responsive to the vehicle load.

It can also be noted that the pressure $P_h$ can be a fixed pressure, the characteristics of the corrector then being independent of the vehicle load.

In addition, the control force $F_c$ and the half control-forces $F_c/2$ can be generated by a mechanical system slaved or not slaved to the vehicle load, in particular two springs mounted in parallel and acting separately on each push rod.

We claim:

1. Braking corrector, for a double braking circuit of a motor vehicle, comprising: a body, two identical parallel bores in the said body defining between them an axis of symmetry, each of the said bores communicating with a corresponding inlet orifice and outlet orifice, two identical pistons sliding in the said bores, each of the said pistons controlling the displacement of a valve element controlling the flow of a fluid under pressure between one of the said inlet orifices and the corresponding outlet orifice, each said pistons presenting an end projecting out from the said body, and a distributor assembly capable of generating, from a control force, two pilot forces acting on the said ends so as to urge the pistons into the body in the direction for establishing the said flow of fluid, the said fluid under pressure urging the pistons out of the body in the direction for cutting off the flow of fluid, said distributor assembly being of the type permitting to increase the pilot force urging one of the pistons when only the inlet orifice corresponding thereto receives fluid under pressure, characterized in that the said distributor assembly comprises: a cover solid with the said body, two iddentical push rods sliding in the said cover parallelly to the said pistons and capable of coming into abutment with the ends of these last, divider means for dividing the said control force into two equal half control-forces each applied to one of the two push rods so as to urge the said pistons into the said body, resilient means for generating a reaction force opposed to the said half control-forces, and a transmission element for distributing the said reaction force as two partial reaction forces each applied to one of the said push rods, each push rod being thereby subjected to two opposed forces: a half control-force and a partial reaction force whose resultant constitutes the said pilot force, the said transmission element being capable of being in contact with the said push rods in two manners: a first manner, when both inlet orifices receive fluid under pressure, in which the surfaces of contact between the transmission element and the push rods are disposed in a symmetrical way with respect to the said axis of symmetry, and a second manner, when only one of the two inlet orifices receives fluid under pressure, in which, following tilting of the transmission element, the surfaces of contact between said transmission element and the push rods are disposed in an asymmetric manner with respect to the said axis of symmetry, which results in a distribution of the reaction force as two unequal partial forces and a corresponding inequality of the two pilot forces.

2. Braking corrector according to claim 1, the control force for which is generated by a control pressure, characterized in that the said divider means comprise a control chamber defined in the said cover and in which the control pressure prevails, the said push rods projecting sealingly into the said control chamber.

3. Braking corrector according to claim 2, for a vehicle including a hydraulic suspension circuit, characterized in that the said control pressure is a pressure from the said hydraulic suspension circuit.

4. Braking corrector according to any one of claims 1 to 3, characterized in that said resilient means comprises a reaction spring compressed between an abutment plate and said transmission element, said spring generating on the latter a resultant force coaxial with the axis of symmetry.

5. Braking corrector according to claim 4, characterized in that the said abutment plate has adjustable axial positioning means, comprising a rod fixed at one end thereof to said plate, said rod passing through said transmission element and said cover and ending in a thread at its other end, a nut being screwed on said thread and in contact with said cover.

6. Braking corrector according to claim 3, characterized in that the said push rods each comprise a large diameter part and an extension of reduced diameter separated by a plane shoulder and that said transmission element is a flat disc having two symmetrical apertures of slightly larger diameter than that of the extensions of the push rods, said transmission element being urged by said resilient means in abutment against the plane shoulders of said push rods.

7. Braking corrector according to claim 1, characterized in that said push rods are stepped to define larger and smaller diameter portions with a shoulder therebetween, said transmission element having apertures located substantially equidistant from said axis of symmetry and receiving the smaller portions of said push rods whereby said shoulders define surfaces of contact about the entire area of said shoulders to define said first manner of contact, said transmission element pivoting upon failure of one of said braking circuits so that said push rods contact said transmission element in said second manner in which the shoulder of one of said push rods contacts said transmission element at a point adjacent said axis of symmetry and the other push rod contacts said transmission element at a point farther away from the axis of symmetry than is the point at which the one push rod contacts the transmission element.

* * * * *